United States Patent [19]

Gupta

[11] Patent Number: 4,898,916

[45] Date of Patent: * Feb. 6, 1990

[54] PROCESS FOR THE PREPARATION OF POLY(VINYLPHENOL) FROM POLY(ACETOXYSTYRENE) BY ACID CATALYZED TRANSESTERIFICATION

[75] Inventor: Balaram B. G. Gupta, North Plainfield, N.J.

[73] Assignee: Hoechst Celanese Corporation, Somerville, N.J.

[ * ] Notice: The portion of the term of this patent subsequent to Aug. 25, 2004 has been disclaimed.

[21] Appl. No.: 231,582

[22] Filed: Aug. 8, 1988

Related U.S. Application Data

[63] Continuation of Ser. No. 22,186, Mar. 5, 1987, abandoned.

[51] Int. Cl.$^4$ ............................................... C08F 8/12

[52] U.S. Cl. ............................... 525/344; 525/328.9; 525/346; 525/355

[58] Field of Search .................. 525/328.9, 344, 346, 525/355

[56] References Cited

U.S. PATENT DOCUMENTS

| | | | |
|---|---|---|---|
| 3,970,534 | 7/1976 | Fujiwara et al. | 525/298 |
| 4,129,617 | 12/1978 | Machi et al. | 525/302 |
| 4,678,843 | 7/1987 | Elmore et al. | 525/328 |
| 4,689,371 | 8/1987 | Elmore et al. | 525/329.5 |

Primary Examiner—Joseph L. Schofer
Attorney, Agent, or Firm—Lynch, Cox, Gilman & Mahan

[57] ABSTRACT

Polymers of 4-vinylphenol are made by the acid catalyzed transesterification of polymers of 4-acetoxystyrene in an alcohol. The 4-vinylphenol polymers are useful as epoxy resins curing agents and as the phenolic base for epoxy resin per se.

11 Claims, No Drawings

PROCESS FOR THE PREPARATION OF POLY(VINYLPHENOL) FROM POLY(ACETOXYSTYRENE) BY ACID CATALYZED TRANSESTERIFICATION

This is a continuation of co-pending application Ser. No. 22,286 filed on 3/5/87, now abandoned.

BACKGROUND OF INVENTION

The field of art to which this invention pertains is homopolymers and copolymers of vinylphenol.

Homopolymers and copolymers of 4-hydroxystyrene, or p-vinylphenol as it is also called, are known compositions which have many uses, such as in the manufacture of metal treatment compositions and photoresists. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerize to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produce p-vinylphenol polymers.

Corson et. al., Journal of Organic Chemistry, 23, 544–549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethyl carbinol which is then dehydrated to p-acetoxystyrene. The p-acetoxystyrene is saponified to p-vinylphenol using potassium hydroxide. Packham, in the Journal of the Chemical Society, 1964, 2617–2624, describes the hydrolysis of crosslinked poly-4-hydroxystyrene by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshady et. al., Journal of Polymer Science, 12, 2017–2025 (1974), hydrolyzed copolymers of styrene and acetoxystyrene to the vinylphenol polymer using hydrazine hydrate in dioxane.

The ester interchange reaction of poly (4-acetoxystyrene) in methanol using sodium methylate is described in U.S. Pat. No. 2,276,138. It is also stated in the patent that resinous polymers are obtained by the treatment of monomeric 4-acetoxystyrene with potassium hydroxide in methanol both cold and hot and with methanol using sulfuric acid as the ester interchange catalyst.

The hydrolysis or methanolysis of polymers of 4-acetoxystyrene is very difficult to carry to 90 percent or above completion. Also, it is extremely difficult to remove all traces of alkali metal salts which can be detrimental for some applications and uses of the vinylphenol polymer.

SUMMARY OF INVENTION

This invention pertains to a process for hydrolyzing polymers of 4-acetoxystyrene to polymers of 4-vinylphenol. More specifically, the invention relates to an alcoholysis process using acids as the alcoholysis catalyst.

By the process of this invention, polymers of 4-acetoxystyrene are slurried in an alcohol and are hydrolyzed to polymers of 4-vinylphenol by heating at about 30° C. to about 65° C. in the presence of an acid for a time sufficient to hydrolyze the acetoxy group to phenolic groups as indicated by dissolution of the polymer in the alcohol. The 4-vinylphenol polymer is recovered as an alcohol solution or can be recovered neat.

DETAILED DESCRIPTION OF INVENTION

Polymers useful in this invention are homo and copolymers of 4-acetoxystyrene. 4-Acetoxystyrene can be polymerized in solution, suspension, emulsion, or bulk using well known free radical catalysts, such as, for example, the peroxide and the azo compounds. 4-Acetoxystyrene will homopolymerize readily in the same manner that styrene homopolymerizes and can also be copolymerized with styrene and with monomers which are copolymerizable with styrene. Examples of comonomers, in addition to styrene, are vinyl toluene, chlorostyrene, bromostyrene, alpha-methyl styrene, the diene monomers, such as butadiene, the acrylate and methacrylate ester monomers, such as methyl acrylate, methyl methacrylate, ethyl acrylate, butyl acrylate, butyl methacrylate and 2-ethylhexyl acrylate. The preferred comonomer is styrene.

Useful copolymers contain about 1 to about 99 parts of 4-acetoxystyrene to about 1 to about 99 parts of monomer copolymerizable therewith. Preferred copolymers contain about 25 to about 75 parts of 4-acetoxystyrene to about 75 to about 25 parts of monomer copolymerizable therewith.

Acids useful in this invention are mineral acids and organic acids as well as Lewis acids which have dissociation constants in aqueous solutions, i.e., $pK_a$, of less than 2 and, preferably, less than 1. Examples of such acids include hydrochloric acid, sulfuric acid, phosphoric acid, methanesulfonic acid, p-toluene sulfonic acid, benzyl sulfonic acid, dichloroacetic acid, trichloroacetic acid, iodic acid, boron trifluoride, aluminum chloride, stannic chloride and the like. The preferred acids are hydrochloric acid, sulfuric acid, methanesulfonic acid and p-toluene sulfonic acid. The amounts of acid used in the process of this invention can vary over a wide range from about 1 percent by weight based on the weight of 4-acetoxystyrene polymer up to about 40 percent by weight. Preferably about 1 to about 10 weight percent of acid is used.

Alcohols useful in this invention are one to four carbon alcohols i.e., methanol, ethanol, the propanols and the butanols. The preferred alcohols are methanol and ethanol with methanol being most preferred.

In carrying out the process of this invention, the 4-acetoxystyrene polymer is slurried in an alcohol in the amount of about 5 percent by weight of polymer up to about 40 percent by weight of polymer in the alcohol wherein the percentages are based on the total weight of polymer and alcohol. The slurry is stirred and the acid catalyst is added. The reactants are held at a temperature of about 20° C. to about 65° C. until the polymer dissolves in the methanol indicating complete conversion of the acetoxy groups to phenolic groups. Generally, this heating period will vary from about 1 hour to about 20 hours. When solution is obtained, indicating the completion of the alcoholysis reaction, the reactants are then neutralized with base to a pH of about 5 to about 7. Under basic conditions, the phenolic groups readily undergo oxidation to quinoid structures and, consequently, undesirable color formation. The solution is then filtered to remove precipitated salts. The solution of the 4-vinylphenol polymer in the alcohol can be used as is. The polymer can also be recovered as a solid by distilling off the volatile solvents and can be purified by being redissolved in a solvent, such as acetone, followed by coagulation in water. The recovered polymer is dried and ground into a fine powder. In an alternative process, the hydrolyzed alcoholic solution can be coagulated in water without neutralization and can be recovered as a solid.

The following examples describe the invention in more detail. Parts and percentages are by weight unless otherwise designated.

EXAMPLE 1

To suitable reactor are added with stirring 5 parts of poly(4-acetoxystyrene), 50 parts by volume of methanol and 1 part by volume of sulfuric acid. The reactor contents are heated to 40° C. and are held at this temperature for 1 hour. At the end of the heating period, the dispersed polymer is completely dissolved in the methanol. Sodium hydroxide pellets, approximately 1 part, are added to make the solution weakly acidic (pH 5-7). The reactor contents are cooled overnight in a refrigerator and are then filtered. The methanol and methyl acetate which are formed in the reaction are then removed in a rotating evaporator. The resulting polymer is dissolved in 50 parts by volume of acetone and the solution is dropped into 1,600 parts of water. The solids are removed from the water by filtration and are dried. The resulting polymer in 80 percent yield is completely hydrolyzed poly (4-vinylphenol) as indicated by infrared analysis. The glass transition temperature of the polymer is 183° C., with a thermal decomposition on set at 360° C.

EXAMPLE 2

To a reactor are added 2 parts of poly-(4-acetoxystyrene), 50 parts by volume of methanol and 0.5 part by volume of concentrated hydrochloric acid. Agitation is begun and the reactor contents are heated to 50° C. After 1.75 hours heating, the polymer is completely dissolved in the methanol. The solution is filtered and 0.5 part of sodium hydroxide is added, followed by filtration. The solvents are removed in a rotatory evaporator and are then dissolved in 20 parts by volume of acetone. The solution is then slowly added to 300 parts of water containing 1 part by volume of concentrated hydrochloric acid. The polymer is removed by filtration and is dried. The resulting polymer in 86 percent yield is identified as poly (4-vinylphenol) by infrared analysis. The glass transition temperature of the polymer is determined to be 169° C. by Differential Scanning Calorimeter (DSC).

EXAMPLE 3

Using the same procedure described in Examples 1 and 2, 2 parts of poly (4-acetoxystyrene), 50 parts by volume of methanol and 0.5 part of methanesulfonic acid are reacted at 50° C. for 30 minutes. At the end of this heating period, complete solution of the polymer is obtained. The polymer product isolated as described in Example 1 and 2 is recovered in 85 percent yield and is identified as poly (4-vinylphenol) by infrared analysis.

EXAMPLE 4

Using the same procedure described in the preceding Examples, 4 parts of a 50, 50 copolymer of 4-acetoxystyrene and styrene are reacted with 50 parts by volume of methanol and 1 part by volume of concentrated hydrochloric acid. After 1 hour heating, complete hydrolysis of the acetoxy groups to phenol groups is obtained.

EXAMPLE 5

To a suitable reactor are added 50 parts of methanol, 5 parts of poly(4-acetoxystyrene) and 0.5 parts of methanesulfonic acid. The reactants are stirred at room temperature under a nitrogen atmosphere overnight (approximately 19 hours). During this time all solids are completely dissolved. The resulting solution is then dropped into 1,000 parts of water. The precipitated solids are removed from the water by filtration and are washed thoroughly with water to remove any acid impurities. The white solid thus obtained is dried in a vacuum oven at 50° C. overnight. The resulting polymer in 100 percent yield is completely hydrolyzed poly(4-vinylphenol) as indicated by infrared analysis.

EXAMPLE 6

To a suitable reactor are added 50 parts of absolute ethanol, 2 parts of poly(4-acetoxystyrene) and 0.5 part of methanesulfonic acid. The reactants are stirred overnight at room temperature under a nitrogen atmosphere (approximately 19 hours). At the end of this period, the polymer is completely dissolved in the ethanol. The resulting solution is then dropped into 1,000 parts of water. The solids are removed from the water by filtration and are washed with a large excess of water to remove any acid impurities. The resulting white polymer is dried in a vacuum oven at 50° C. overnight. The polymer is obtained in 95 percent yield and is completely hydrolyzed poly(4-vinylphenol) as indicated by infrared analysis.

EXAMPLE 7

Using the same procedure as described in the preceding examples, 2 parts of poly(4-acetoxystyrene), 2 parts of boron trifluoride etherate and 50 parts of methanol are reacted overnight at room temperature. At the end of this period, the resulting polymer solution is dropped in 1,000 parts of water, the precipitated polymer is washed with water and is then dried in a vacuum oven at 50° C. overnight. The polymer product is recovered in 100 percent yield and is completely hydrolyzed poly(4-vinylphenol) as indicated by analysis.

EXAMPLE 8

To a suitable reactor are added 55 parts of distilled water, 0.05 part of potassium persulfate and 0.5 part of sodium lauryl sulfate. When solution is obtained, 22 parts of para-acetoxystyrene are added. Nitrogen is bubbled through the mixture to displace the air and to disperse the para-acetoxystyrene monomer. The mixture is then stirred for 5 hours at 75° C. The resulting polymer emulsion is then dispersed in 200 parts of methanol. Concentrated hydrochloric acid, 3 parts, is added and stirring is conducted overnight. At the end of this period, the dispersed polymer is completely dissolved in the methanol. The resulting solution is dropped into 3000 parts of water, is filtered to remove the solids and the solids are washed with a large excess of acid to remove acidic impurities. The snow white polymer is dried in a vacuum oven at 50° C. overnight to obtain 14.3 parts (75 percent yield) of completely hydrolyzed poly(4-vinylphenol) as indicated by infrared analysis.

The 4-vinylphenol polymers obtained by this invention are used to cure epoxy resins, e.g., the diglycidyl ether of Bisphenol A. The polymers are also converted into epoxy resins by reacting them with epichlorohydrin using caustic as the condensation catalyst and the dehydrohalogenation catalyst.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A process for converting polymers of 4-acetoxystyrene to polymers of 4-vinylphenol which comprises:
   a. forming a slurry of the polymer of 4-acetoxystyrene in an alcohol;
   b. adding an acid to the slurry;
   c. holding the slurry at a temperature of about 20° C. to about 65° C. until the polymer dissolves in the alcohol, indicating complete conversion of the acetoxy groups to phenolic groups;
   d. adding a base in an amount sufficient to raise the pH to about 5 to about 7; and
   e. recovering the 4-vinylphenol polymer.

2. The process of claim 1 wherein the polymer of 4-acetoxystyrene is a homopolymer.

3. The process of claim 1 wherein the polymer of 4-acetoxystyrene is a copolymer of 4-acetoxystryene and a monomer copolymerizable therewith.

4. The process of claim 3 wherein the monomer copolymerizable therewith is styrene.

5. The process of claim 1 wherein the acid has a $pK_a$ of less than 2.

6. The process of claim 1 wherein the acid is hydrochloric acid.

7. The process of claim 1 wherein the acid is sulfuricacid.

8. The process of claim 1 wherein the acid is methane sulfonic acid.

9. The process of claim 1 wherein the alcohol is a one to four carbon alcohol.

10. The process of claim 9 wherein the alcohol is methanol.

11. The process of claim 9 wherein the alcohol is ethanol.

* * * * *